US009535789B2

(12) United States Patent
Gulati et al.

(10) Patent No.: US 9,535,789 B2
(45) Date of Patent: *Jan. 3, 2017

(54) TRANSPARENT AND LIGHTWEIGHT RECOVERY FROM HARDWARE MEMORY ERRORS

(71) Applicant: VMware, Inc., Palo Alto, CA (US)

(72) Inventors: Ajay Gulati, Palo Alto, CA (US); Abhishek Chaturvedi, Mountain View, CA (US); Gregory T. Harmon, Los Angeles, CA (US); Anil Rao, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/270,310

(22) Filed: May 5, 2014

(65) Prior Publication Data

US 2015/0019906 A1 Jan. 15, 2015

Related U.S. Application Data

(63) Continuation of application No. 12/946,658, filed on Nov. 15, 2010, now Pat. No. 8,719,661.

(51) Int. Cl.
*G06F 11/00* (2006.01)
*G06F 11/10* (2006.01)
*G06F 11/14* (2006.01)

(52) U.S. Cl.
CPC ....... *G06F 11/1088* (2013.01); *G06F 11/1412* (2013.01); *G06F 2211/1009* (2013.01); *G06F 2211/1035* (2013.01)

(58) Field of Classification Search
CPC ... G06F 11/08; G06F 11/1412; G06F 11/1435; G06F 11/1658; G06F 11/1666; G06F 12/08; G06F 12/0864; G06F 12/0866; G06F 12/0868; G06F 12/0873; G06F 12/0882; G06F 12/12; G06F 12/126; G06F 12/16; G06F 11/1009
See application file for complete search history.

(56) References Cited

U.S. PATENT DOCUMENTS

| 5,598,549 A | * | 1/1997 | Rathunde ........................ 711/114 |
| 5,600,816 A | * | 2/1997 | Oldfield et al. .............. 711/113 |
| 5,784,707 A | | 7/1998 | Khalidi et al. |

(Continued)

FOREIGN PATENT DOCUMENTS

| JP | 2000122929 | * | 4/2000 | ............. G06F 12/08 |

OTHER PUBLICATIONS

Google Groups, "mergemem: announce & design issues", Mar. 17, 1998, 5 pages. http://groups.google.com/group/muc.lists.linux-kernel/browse_thread/thread/387af278089c7066/7c9444fa2e2cab2c?q=mergemem.

(Continued)

*Primary Examiner* — Gabriel Chu

(57) ABSTRACT

Systems and methods are disclosed that allow for transparently recovering from an uncorrected multi-bit error of arbitrary length located at a memory address. Storing one or more parity pages, for a set of pages in system memory, such that a page in the set of pages may be reconstructed using one of the parity pages is disclosed. Storing an indication of one or more page'disk location such that the one or more pages may be reconstructed by refilling the page from disk is also disclosed.

19 Claims, 9 Drawing Sheets

(56) References Cited

U.S. PATENT DOCUMENTS

| | | | |
|---|---|---|---|
| 6,075,938 | A | 6/2000 | Bugnion et al. |
| 6,223,301 | B1* | 4/2001 | Santeler et al. ............... 714/6.2 |
| 7,200,770 | B2 | 4/2007 | Hartwell et al. |
| 7,293,138 | B1* | 11/2007 | Mahmoud ..................... 711/114 |
| 7,620,766 | B1 | 11/2009 | Waldspurger |
| 2001/0039632 | A1* | 11/2001 | MacLaren et al. ............... 714/6 |
| 2002/0104037 | A1* | 8/2002 | McAfee ........................... 714/6 |
| 2003/0070057 | A1 | 4/2003 | Kakeda et al. |
| 2003/0196137 | A1* | 10/2003 | Ahmad ............. G06F 11/1441 714/13 |
| 2006/0085671 | A1* | 4/2006 | Majni et al. ....................... 714/5 |
| 2007/0089035 | A1* | 4/2007 | Alexander et al. ........... 714/766 |
| 2009/0210774 | A1* | 8/2009 | Godard et al. ................ 714/801 |
| 2011/0066793 | A1* | 3/2011 | Burd ............................ 711/103 |
| 2011/0271039 | A1* | 11/2011 | Baek et al. ................... 711/103 |
| 2012/0084496 | A1* | 4/2012 | Rudelic et al. ............... 711/104 |

OTHER PUBLICATIONS

Home of the Mergemem Project, "Mergemem—What is mergemem?", 4 pages. http://mergemem.ist.org/.

Ulrich Neumerkel et al., "MERGEMEM extended abstract for application at the Augsburg Linux-Kongress 1999", Jun. 15, 1999, 2 pages.

Jake Edge, LWN.net, "KSM runs into patent trouble", Dec. 3, 2008, 9 pages. http://lwn.net/Articles/309155/.

Garth Gibson. "Reliable. Parallel Storage Architecture: RAID & Beyond", School of Computer Science & Dept of Electrical and Computer Engineering Carnegie Mellon University, URL: http://www.cs.cmu.edu/Web/Groups/PDL/Anonymous FTP on ftp.cs.cmu.edu in projecl/pdl, ISCA '95 Reliable, Parallel Storage Tutorial, Slides 1-74.

U.S. Appl. No. 12/636,010, filed Dec. 11, 2009, titled "Transparent Recovery From Hardware Memory Errors".

AMO BIOS and Kernel Developer's Guide, found at <http://www.amd.com/us-en/assets/content_type/white_papers_and_tech_docs/31116.pdf>, 31116 Rev. 3.48, Apr. 22, 2010.

P. M. Chen, G. A. Gibson, R.H. Katz, and D. A. Patterson, "An Evaluation of Redundant Arrays of Disks Using an Amdahl 5890," in SIGMETRICS '90: Proceedings of the 1990 ACM SIGMETRICS conference on Measurement and Modeling of Computer Systems, pp. 74-85, New York, NY, USA, 1990. ACM.

HP Integrity rx2660 Server data sheet, found at <http://integrity.albacomp.hu/download/rx2660_adatlap.pdf>.

IBM eServer article "Chipkill Memory," found at <http://www-05.ibm.com/hu/termekismertetok/xseries/dn/chipkill.pdf>.

D. A. Patterson, G. Gibson, and R.H. Katz. "A Case for Redundant Arrays of Inexpensive Disks (RAID)," in Sigmod '88: Proceedings of the 1988 ACM SIGMOD International Conference on Management of Data, pp. 109-116, New York, NY, USA, 1988. ACM.

B. Schroeder, E. Pinheiro, and W. D. Weber, "Dram Errors in the Wild: a Large-Scale Field Study," in SIGMETRICS '09: Proceedings of the Eleventh International Joint Conference on Measurement and Modeling of Computer Systems, pp. 193-204, New York, NY, USA, 2009. ACM.

* cited by examiner

TRANSPARENT AND LIGHTWEIGHT RECOVERY FROM HARDWARE MEMORY ERRORS

CROSS-REFERENCES TO RELATED APPLICATIONS

This patent application is a continuation of U.S. application Ser. No. 12/946,658 filed Nov. 15, 2010, which is hereby incorporated herein by reference in its entirety. This patent application is related in subject matter to commonly owned U.S. patent application Ser. No. 09/915,045, filed Jul. 25, 2001 (now U.S. Pat. No. 6,789,156), which is hereby incorporated herein by reference in its entirety ("Waldspurger").

BACKGROUND

When a computer Central Processing Unit ("CPU") is executing an application, the CPU needs access to the application's program instructions and data, which are generally stored in a persistent storage device, such as the hard drive of a single computer or in storage units connected to networked systems. The term "disk" is used in this patent to refer generally to any persistent storage device. Retrieving instructions and data from a disk takes a long time in terms of processing, and if the CPU had to retrieve instructions and data from a disk each time they were needed, computers would not run efficiently. Therefore, most modern computing systems including high-speed system memory, usually implemented using solid-state random access memory (RAM) components. Program instructions and data are copied into the memory, so that they do not need to be retrieved from disk when they are needed by the CPU.

System memory is divided into segments usually referred to as "memory pages." A page is a block of main memory that is contiguous. A page is a unit of instructions and/or data that is transferred between the disk and memory, and usually the smallest unit of data for which the operating system allocates memory.

Many modern computer systems also include virtual memory as is well understood in the art of computer software. Virtual memory is an abstraction that allows for system memory to appear larger than it is, making retrieval of instructions and data more efficient. Virtual memory allows for a page that does not currently reside in main memory to be addressed as if it did. Virtual memory is implemented by creating virtual memory addresses for pages and then using a page table, i.e. a data structure that maps each page in "virtual memory" to a physical location, which may be in memory or on a disk. Virtual page numbers ("VPNs") are often saved in the pages table to indicate the virtual address. For example, when a "context" is loaded into memory, some of pages may be given virtual memory addresses even though the pages have not yet been loaded into system memory. The page table will map the virtual address of the page to its location on the disk. The term "context" is used in this patent to refer to any software or hardware component, device or system that addresses and reads from the hardware memory and that has its own address translation (mapping) state. For a traditional OS, the term "context" includes a "process" or an "application" that has an address space and associated page table that contains information about how to map virtual pages to physical pages and other page-level information. For a virtualized system, which is described in more detail below, the term "context" would also include a virtual machine ("VM").

FIG. 1 is a diagram illustrating an example of a page table 100 mapping virtual pages VPN 1 110, VPN 2 112, VPN 3 114, and VPN 4 116 for a context to an indication of their location in either in system memory 102 or on disk 104. (The numbers 1-4 are used to refer to the virtual pages and are not meant to be examples of actual VPNs.) Arrows 120, 122, 124 and 126, are used to illustrate the indication of the page's location that is saved in column 106. When a page has been loaded into system memory, the indication of its location may be a physical page number "PPN," which can be used to determine the page's address in system memory. When the page has not yet been loaded into system memory, the indication shown in column 106 may be the page's address on the hard disk. As shown, VPN 1 110 is mapped to system memory page 132 by 120, and VPN 2 112 is mapped to system memory page 130 by 122. VPN 3 114 is mapped to the page on disk 140 by 124, and VPN 4 116 is mapped to a page on disk 142 by 126.

Virtual memory also may use an area on the disk referred to as "swap" or the "swap file" temporarily store memory pages that have already been loaded into memory or pages that have been recently created and have not yet been stored in a permanent disk location. Some of the pages in swap may be permanently stored on disk at a later time, and some may just be cleaned once the program exits, such as pages allocated to a process for runtime data such as heap allocations. When memory is becoming full, the operating system may move a page to swap to make room for more pages to be loaded into system memory. In some cases, reloading the page from swap is more efficient than reloading it from its original disk location. In FIG. 1, 140 and 142 are meant to illustrate either disk locations where pages are permanently stored in memory or pages temporarily stored in a swap.

Virtual memory works by generating an exception, called a page fault, if a program tries to access a "virtual page" that is not in memory. The hardware or operating system is notified and loads the required pages from the disk into system memory. The context which addressed the memory has no knowledge of the page fault or the process following it, thereby allowing a context to address more (virtual) system memory than physically exists in the computer. Memory pages consist of a series of bits that are the current content of that page. Due to variety of reasons, such as cosmic radiation, etc., these bits may spontaneously change their value, thereby corrupting the content of the page. These corruptions are often referred to as bit-errors. The overall resources available in each server, such as CPU cores and memory capacity have been growing very rapidly, With the rapid increase in memory capacity per server, the probability of multi-bit errors occurring in memory has grown as well. Therefore, there is a higher likelihood that there may one or more multi-bit errors of arbitrary length on a memory page. There are two types of errors in memory: persistent and non-persistent (transient) errors. A persistent error denotes a permanent fault in memory hardware, such that the hardware will continue to corrupt a bit each time it is used. A transient error is one that happens just once and is often attributed to a cosmic ray collision as high-energy particles striking a memory chip can disturb the state of the RAM and cause the corruption. When either a persistent or non-persistent multi-bit error occurs, the operating system may panic (or "crash") the entire system, affecting all of the services that may be running on that host. If the error is ignored without any corrective action, there is a risk that user data will be corrupted or the system will otherwise operate incorrectly.

SUMMARY

Generally, systems and methods are disclosed that allow for transparently recovering from an uncorrected multi-bit error of arbitrary length (as used, herein, "multi-bit errors of arbitrary length" would include errors of one bit length) located at a memory address as identified by a memory device. Protecting memory pages by either a parity page or by tracking the page's disk location is disclosed. In some embodiments, which error correcting method is used depends on the page's category and/or the page's type. Examples of a pagers category include, but are not limited to, whether the pages is in the kernel or the context it is in, such as a User World Application or a Virtual Machine. In some embodiments, if an error cannot be corrected using one of the disclosed methods, only the context(s) using the page will be terminated. Additionally, systems and methods are disclosed for constructing parity pages using a background process or "daemon."

DETAILED DESCRIPTION

The invention can be implemented in numerous ways, including as a process, an apparatus, a system, a composition of matter, a computer readable medium such as a computer readable storage medium. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known for the technical fields listed to the invention has not been described in detail so that the invention is not unnecessarily obscured.

Figure 2:
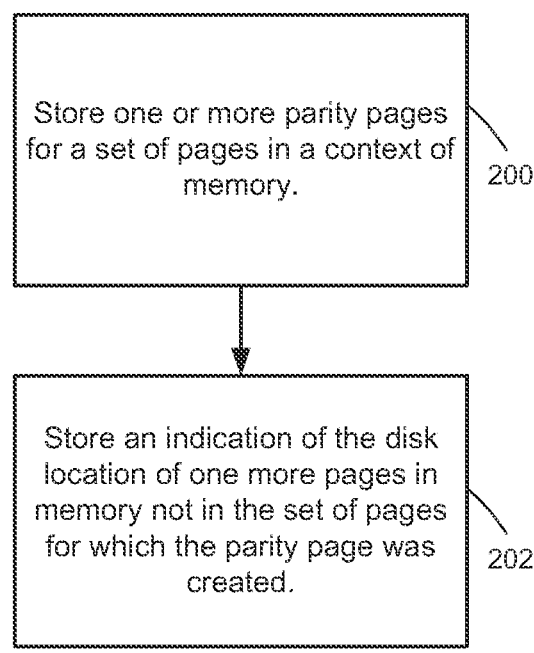
FIG. 2 is a flow chart illustrating a method for protecting memory page from multi-bit errors of arbitrary length.

FIG. 2 is a flow chart illustrating a method for protected memory pages from multi-bit errors of arbitrary length. The method allows for correcting errors in an unlimited number of bits on a page, and is not limited to any particular page size. At step 200 one or more parity pages are stored in system memory for a set of memory pages in a context. At step 202, an indication is stored of the disk location of one or more pages not in the set of pages for which the parity page was stored.

Parity Page

A parity page is a page that can be used to correct multi-bit errors of arbitrary length that occur on page in a set of pages. A parity page PP is constructed such that any page $P_K$ in a given set of M number of pages ($P_1$-$P_M$) can be reconstructed by using the parity page PP. Further, for a given set of M memory pages, N number of parity pages ($PP_1$-$PP_N$) may be stored, such that if N pages in the set ($P_1$-$P_M$) have multi-bit errors of arbitrary length, those N pages may be reconstructed using the parity pages $PP_1$, . . . $PP_N$. The number of N of parity pages stored for a set of M pages determines the number of pages that may be reconstructed. For example, if there are 2 parity pages for a set of M pages, then up to two pages with errors may be corrected.

In some embodiments, a function is used on the set of M pages to construct the parity page, i.e. PP=f($P_1$, $P_2$, . . . $P_M$). In some embodiments, the function is chosen such that if there is an error on any page $P_K$ that page may be reconstructed by performing the function on the set of M pages with the parity page PP replacing the page with the error, i.e. $P_K$=f($P_1$, $P_2$, . . . $P_{K-1}$, PP, $P_{K+1}$, . . . $P_M$).

In some embodiments, the function used to construct the parity page is the XOR function. XOR is a Boolean function, i.e. a function that returns a value of true or false, generally represented in computer software as a 1 for true and a 0 for false. XOR returns a value of true "1" if all of two operands are different, and a value of false "0" is two operands are the same. For example, XOR (0,0)=0, and XOR (1,0)=1. When using XOR on more than two operands, generally the first two are XORed, an then that result is XORed with the next, and then that result is XORed with the next, i.e. XOR (1, 0, 0)=XOR ((XOR (1, 0), 0)=1; however, XOR function is commutative, i.e. A (XOR (B XOR C)=(A XOR B) XOR C. Performing the XOR function on a set of more than two bits will return a "true" or 1 if the number of 1's in a set of bits is odd.

Figure 3A:
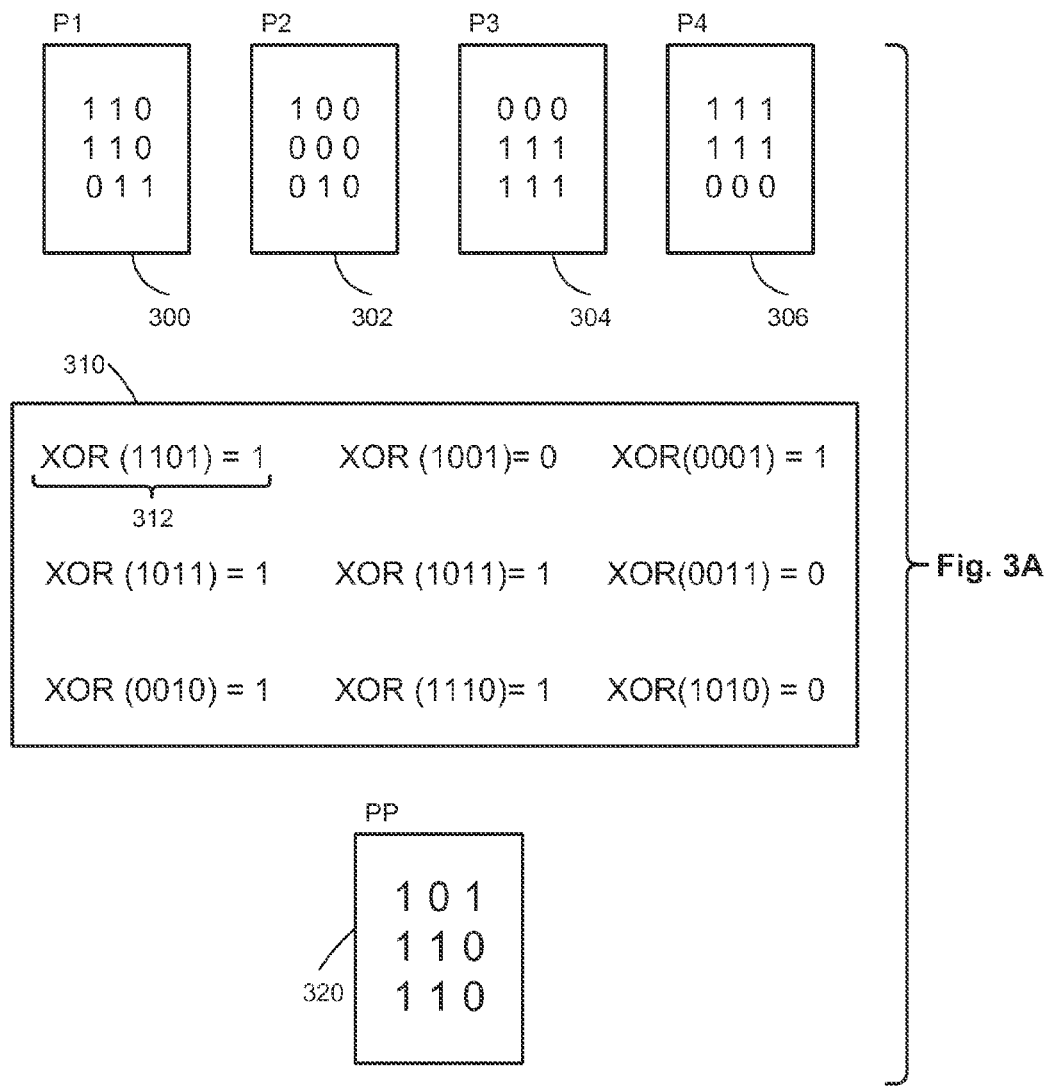
FIG. 3A is a diagram illustrating the construction of a parity page using XOR.

FIG. 3A is a diagram illustrating the construction of a parity page using XOR. In FIG. 3A, the parity page PP 320 is constructed for the set of memory pages $P_1$ 300, $P_2$ 302, $P_3$ 304, and $P_4$ 306. Constructing the parity page for the set $P_1$ 300, $P_2$ 302, $P_3$ 304, and $P_4$ 306 is illustrated at 310. At 312, the first bit in the each page in the set $P_1$ 300, $P_2$ 302, $P_3$ 304, and $P_4$ 306 is XORed to determine the first bit of the parity page. As also shown in 310, this process is performed for all of the other bits in the pages in the set, resulting in the parity page PP 320.

XOR is an example of one method for constructing parity pages. Constructing parity pages in well known in the art and using other methods to construct a parity page would be well understood. A non-exclusive list of other methods which may used to construct a parity page includes, using even/odd parity, or the Reed-Soloman method.

Figure 1:
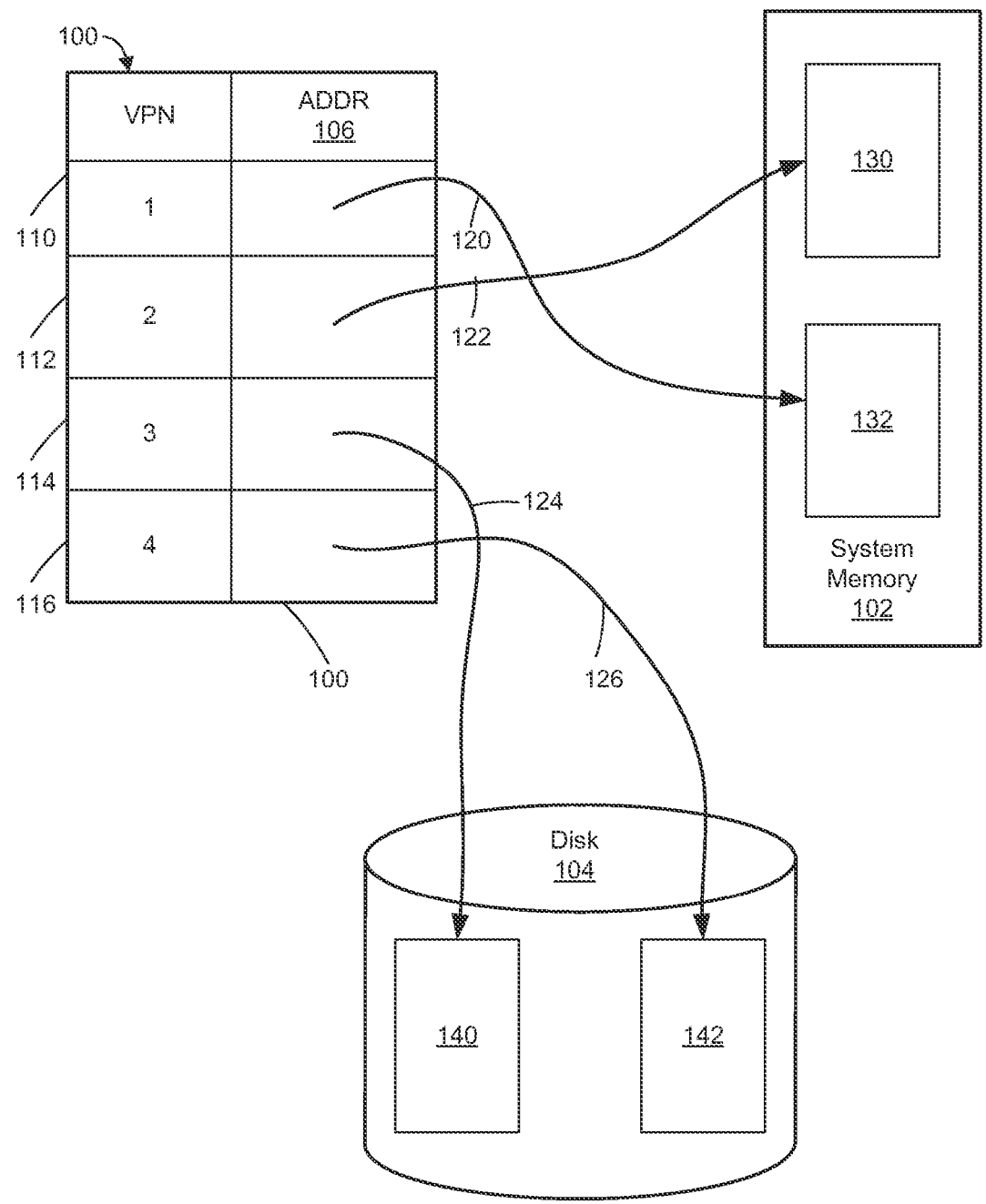
FIG. 1 is a diagram illustrating an example of a page table for virtual memory.
Figure 3B:
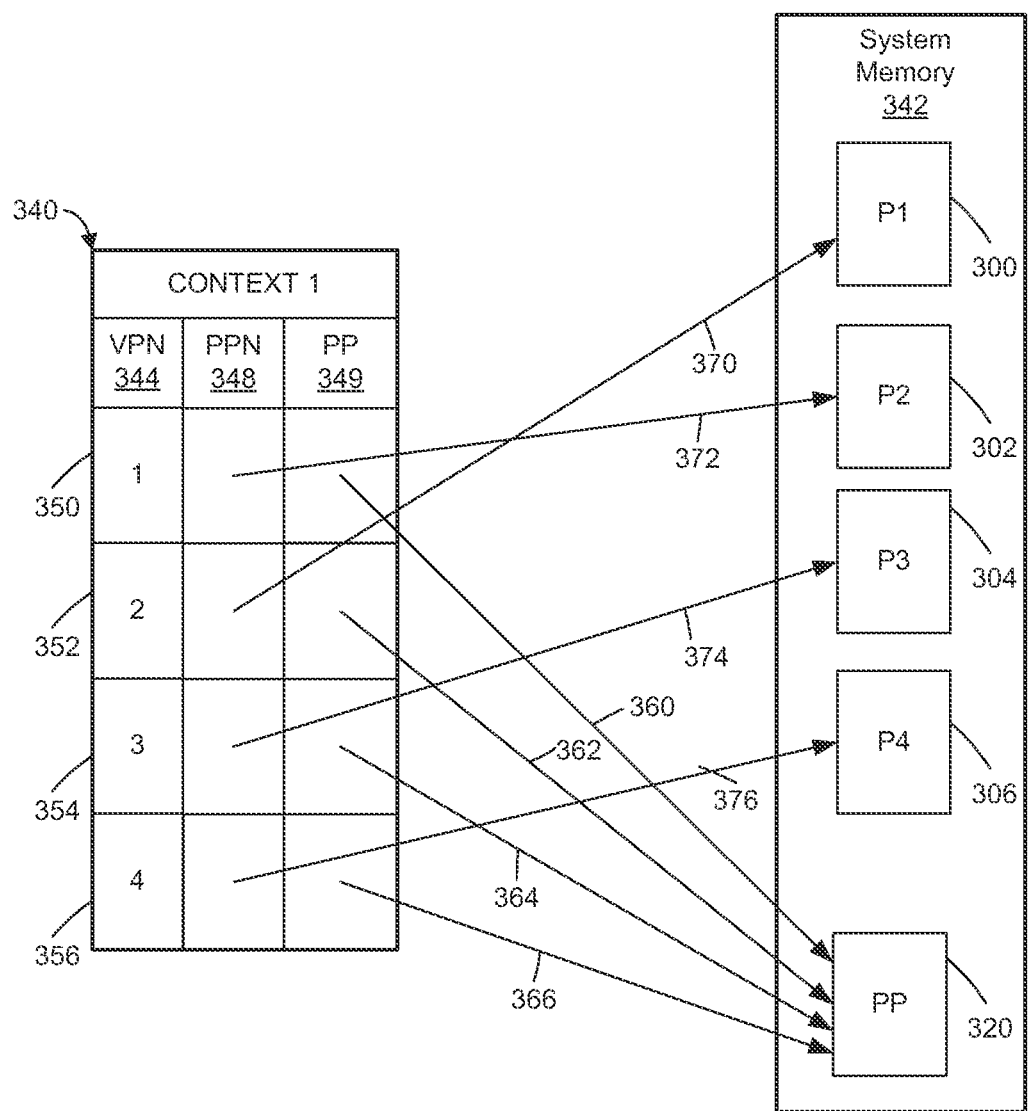
FIG. 3B is a diagram illustrating a parity page stored in memory.

Once a parity page has been constructed, it may be stored in system memory. FIG. 3B is a diagram illustrating a parity page stored in memory. FIG. 3B illustrates storing the parity page PP 320 that was constructed in FIG. 3A. Once a parity page is stored, an association between the parity page and the set of pages it protects may be stored, so that when there is a multi-bit error on a protected-page, its parity page may be found. In some embodiments, the association may be included in the page table as also illustrated in FIG. 3B. In FIG. 3B, the virtual page numbers ("VPNs") in column 344 correspond to the protected-pages from FIG. 3A (P1-P4). VPN 1 350 corresponds to P2 302, VPN 2 352 corresponds to P1 300, VPN 3 corresponds to P3 304, and VPN 4 356 corresponds to P4 306. (Again, as in FIG. 1, the numbers 1-4 are used to refer to the virtual pages, and are not meant to illustrate examples of VPNs.) VPNs 1-4 in column 344 are mapped to their locations in system memory by their physical page numbers ("PPNs") 370, 372, 374, and 376 respectively in column 348. In some embodiments as shown in FIG. 3B, an additional field 349 may be included in the page table 340 for storing pointers 360, 362, 364, and 366 to the parity page 320 in memory. In other embodiments, the parity page metadata may include the list of pages in the set of pages for which the parity page was constructed. These examples are described for illustrative reasons and are not meant to be limiting in any way. It would be well understood in the art how to create an association between the parity page and the pages in memory that it protects.

In some embodiments, the values for M, the number of pages in the set for which the parity page was constructed, and N, the number of parity pages for the set, may be determined based on a policy tuned to satisfy any tradeoff requirements between computational and spatial overheads. The smaller M is, the larger the number of parity pages that will be constructed, and thus the more memory that will be used. In some embodiments, the policy may differ based on the page's category, e.g., there may be one policy for kernel pages and another policy for applications pages. In some embodiments, the value for M or N may be hard coded. In some embodiments, the value for M or N may be user definable.

In some embodiments, parity pages may be constructed for read-only pages; however, in other embodiments, parity pages may be constructed for read-write pages as well but at a higher cost. In some embodiments, pages that are protected by parity will be write-protected, such that a protected-page fault will occur if there is an attempt to write to one of the pages protected by parity. Marking a set of pages write-protected is well known in the art.

In some embodiments, the protected-page fault handling process will be extended so that it marks the associated parity page dirty when there is an attempted write to one of the write-protected pages. For example, in some embodiments, the metadata, for the parity page will include a field for a dirty bit. Once an attempt has been made to write to one of the write-protected pages, its associated parity page may be marked as dirty and need to be reconstructed. In some embodiments, the protected-page fault handling process may be extended to reconstruct the parity page. In some embodiments, the reconstruction, process may include discarding the parity page, and constructing a new parity page on the set made up of the M pages protected by the original parity page without the page(s) that have been written to.

Figure 3C:
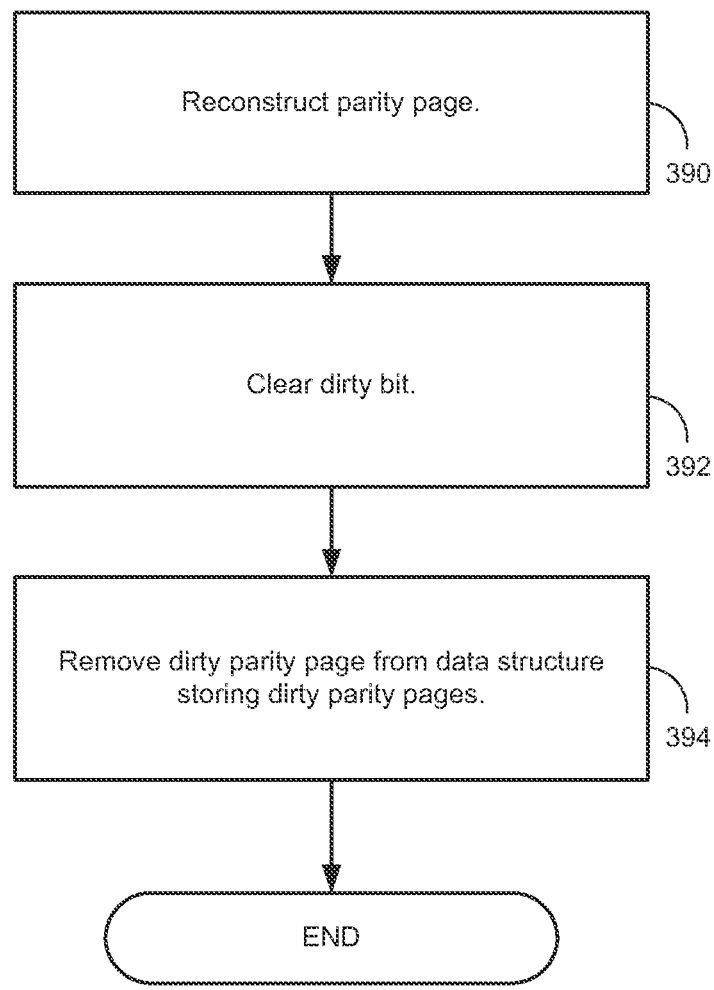
FIG. 3C is a flowchart illustrating a method for constructing an updated parity page for each page in the set of dirty parity pages.

In some embodiments, reconstructing the parity page may be done by another process that periodically updates parity pages that have been marked dirty, i.e. a process running in the background or "daemon." In some such embodiments, the protected-page fault handling process may mark the parity page dirty and add the parity page to a data structure storing all dirty parity pages. This data structure may be stored by the kernel. A background process or daemon may then periodically check the data structure to determine if there are any dirty parity pages in the data structure, and if so, construct updated parity pages for each one of them. FIG. 3C is a flowchart illustrating a method for creating an updated parity page for each page in the set of dirty parity pages. At step 390, the parity page is reconstructed. In some embodiments, the updated parity page may be constructed on a set of pages including only the pages in the original set of M pages that have not been written to. At step 392, the dirty bit(s) for the parity page are cleared. At step 394, the parity page is removed from the data structure.

Refill-From-Disk

Figure 4:
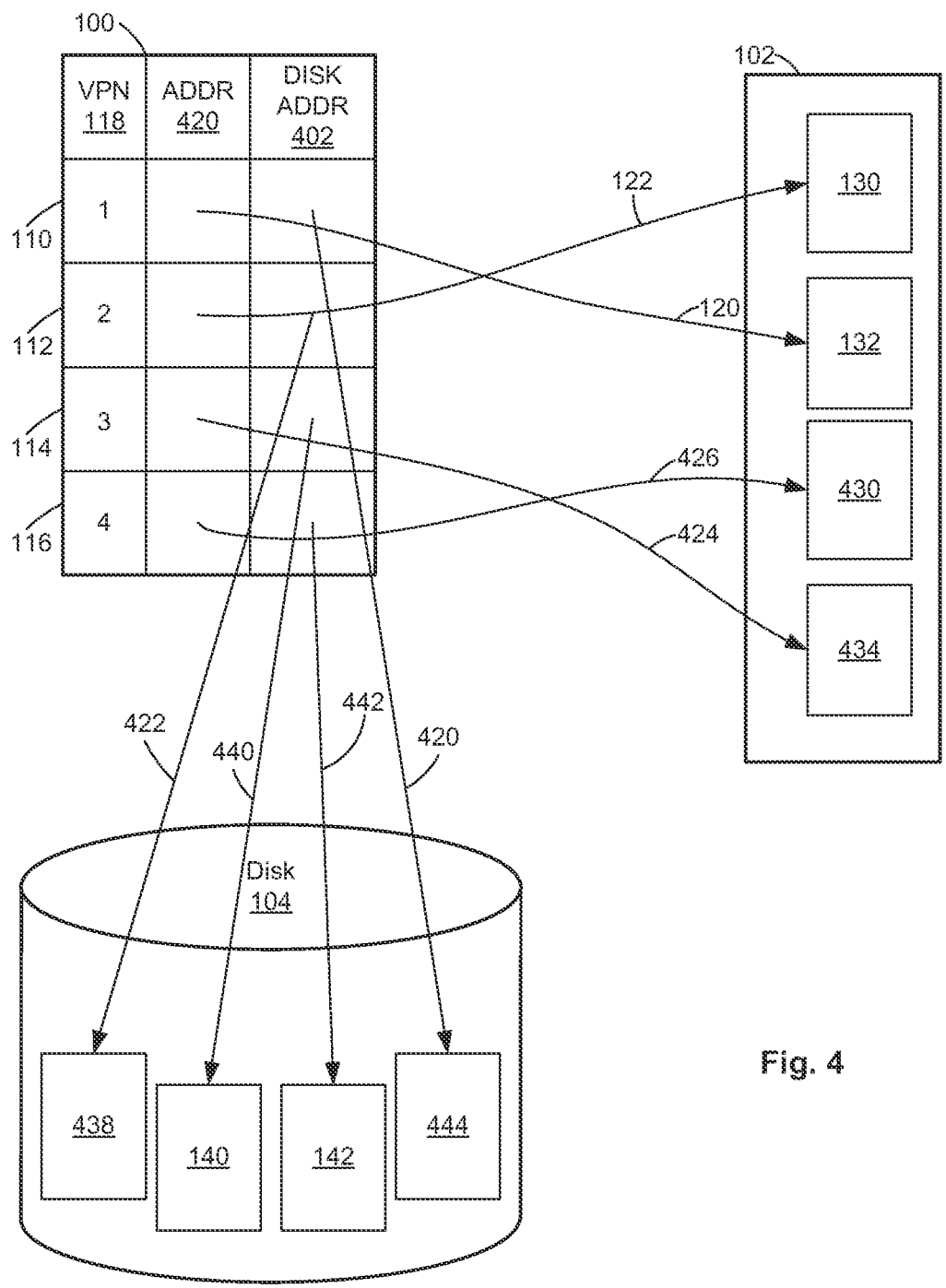
FIG. 4 is a diagram illustrating an embodiment for storing such an indication in the page table of the context using the protected memory page.

As illustrated above, in step 202 of FIG. 2 memory pages may be protected by storing an indication of their disk location so that if a memory error occurs on a page, the page may be reloaded from its disk location. Protecting pages in this manner is referred to herein as using "refill-from-disk." The indication of a page's disk location may be stored in the metadata for the page. For example, FIG. 4 is a diagram illustrating an embodiment for storing such an indication in the page table of the context using the protected memory page. FIG. 4 is an illustration of the page table of FIG. 1 once VPN 3 and VPN 4 have been loaded into memory as illustrated by 430 and 434, and their addresses have been changed in the page table to their address in system memory as shown at 424 and 426. In addition, FIG. 4 includes a field 402 for storing an indication of the memory pages' location on disk.

In such an embodiment, if VPN 1 and VPN 2 are protected by refill-from-disk, an indication of their locations on disk illustrated at 438 and 444, would have been stored in field 402 as shown by 420 and 422 when there were loaded into memory. This indication may be their disk address. Additionally, when VPN 3 and VPN 4 were loaded into memory, the indication of their disk location, i.e. 140 and 142 of FIG. 1 would be stored in field 402, as illustrated by 440 and 442 of FIG. 4.

In some embodiments, the pages for which an indication of the disk location has been stored are write-protected, such that a protected-page fault will occur if there is an attempt to write to the page. Marking a page write-protected is well known in the art. In some embodiments, the protected-page fault handling process may be extended so that when a page is written to, the indication of page's disk location, e.g. the entry in field 402, is deleted.

In some embodiments, the indication of the disk location will indicate the location of the latest copy of the page in the swap file, so that if the page has been written to, but is the same as the copy in the swap file, the page may be refilled from the swap file.

Determining Whether to Protect a Page by Parity or Refill-From-Disk

In some embodiments, determining if a page in memory will be protected by parity or by using refill-from-disk is based on its category and/or type. In the description following, an embodiment of the present invention is presented in the context of a virtualized system platform. This description is provided for illustrative reasons and is not meant to be limiting in any way. It would be well understood in the art how to apply the same concepts to a traditional non-virtualized platform.

Virtualized Systems

Figure 5:
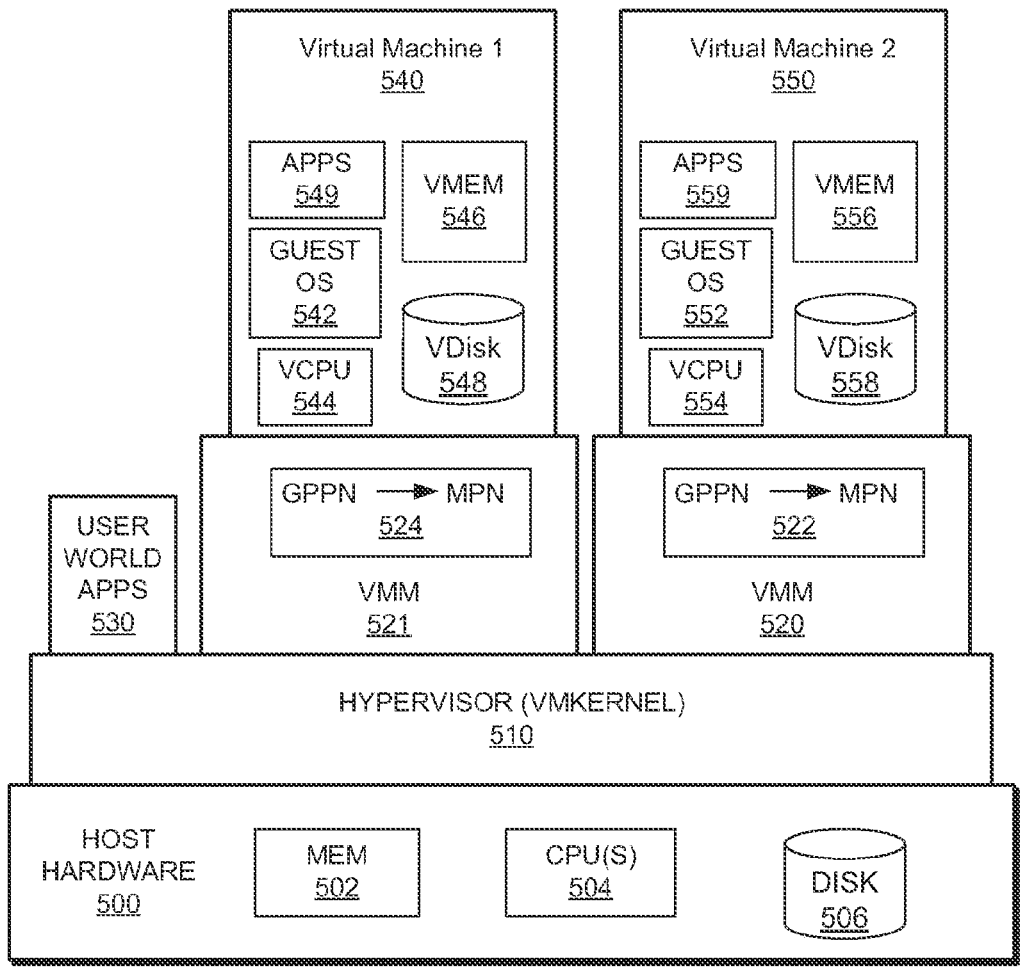
FIG. 5 is a diagram illustrating an overview of a virtualized system.

FIG. 5 is a diagram illustrating an overview of a virtualized system. As is well known in the art of computer science, a virtual machine "VM" is a software abstraction—a "virtualization"—of an actual physical computer system or "host." In other words, a VM comprises virtualized hardware components, i.e. software emulating the corresponding hardware resources of the host computers.

As FIG. 5 illustrates, the host platform 500 includes hardware resources, such as one or more processors "CPUs" 504 (only one shown), system memory 502, a storage device, such as a disk 506. The host platform may also include peripheral devices, which are not shown. The host platform includes hypervisor 510, including a VMkernel. In alternate embodiments, the host platform may include a commodity host operating system, which may be a conventional general purpose operating system.

Virtual Machines. As illustrated in FIG. 5, each "guest" VM 540 and 550 typically includes one or more virtual CPUs 544 and 554 (only one shown per VM), one or more virtual disks 548 and 558 (only one shown per VM), and a virtual system memory, "VM memory" 546 and 556. The virtual system will also typically include a guest operating system guest OS (which may simply be a copy of a conventional general purpose operating system) 542 and 552, and virtual peripheral devices which are not shown.

A virtual machine monitor (VMM) 520, 521 interfaces between a VM and the VMkernel and host platform's hardware resources. The host platform is responsible for actually executing VM-issued instructions and transferring data to and from the actual system memory 502 and storage devices, such as disk 506. VMM 520, 521 virtualizes the host platform's hardware resources and exports them to the guest OS's so that it appears to the guest OSs 542 and 552 as if the VM's virtualized hardware component (e.g., the virtual CPU's 544, 554, virtual disks 548 and 558, and virtual system memory 546 and 556) are actual hardware resources. Thus, the VMM allows the guest OSs 542 and 552 to interact with virtualized hardware components as if they were actual physical hardware resources. In some cases, the interface exported to the guest OS's larges corresponds to the architecture, resources and device complements of the underlying host hardware platform, but in other cases it need not.

Applications 549 and 559 may reside in each VM. The instructions and data for an application running in the VM are accessed by the guest OS from the virtual disk 548 and 558 or VM memory 546 and 556, which will simply be portions of the actual physical disk or memory allocated to that VM. Once an application is installed within the VM, the Guest OS retrieves files from the virtual disk just as if they had been pre-stored as the result of a conventional installation of the application on a disk.

VM memory 546 and 556 is partitioned into pages. Guest OSs 542, 552 in a VM generally implement "virtual memory" in a similar manner described above with reference to FIG. 1. When the guest OS loads a page into VM memory, the Guest OS addresses the pages for the application, creating a mapping in a page table between the guest virtual page number GVPN and what it believes is the physical page number, referred to as the "Guest Physical Page Number" or "GPPN." However, there is an additional mapping required between the Guest Physical Page Number GPPN and the actual host physical address, referred to as the "Machine Page Number" of "MPN." An example of such a mapping is illustrated at 522 and 524 of FIG. 5. Generally there is one such mapping for each VM, which may be stored in a data structure similar to the page tables described in FIG. 1. As illustrated at 522 and 524 in FIG. 5, this mapping may be stored in the VMM, but may also be implemented in other ways as is well understood in the art, such as being stored in hypervisor 510 or host OS (not shown).

User World Applications. In addition to applications which run in the VMs, virtualized systems also include User World Applications 530, which run directly on the host, rather than in a VM. For example, applications a system administrator would use to monitor the hardware or to perform other administrative routines would be User World Applications.

Kernel. As is well understood in the art, the kernel is the software that acts as an interface between the applications and the hardware resources (such as CPU/Memory/Disk/Network). In a virtualization context, this may be referred to as a 'hypervisor.' The concepts proposed below are generic and are means to apply to any kernel.

Protecting Memory Pages

Various policies may be used to determine whether a page in memory should be protected by parity, refill-from-disk or not protected by either. In some embodiments, determining how and whether a page will be protected may be based in part on its category and/or its type. One example of such a policy is illustrated in Table 1 below. The example of a policy shown in Table 1 below is presented for illustrative reasons and is not meant to be limiting. Different policies may be implemented for determining whether memory pages should be protected by either parity or the re-fill from disk method, and that pages may be protected using both techniques. Also, the embodiment described in Table 1 is presented in the context of a virtualized system. It would be well understood in the art how to apply the same concepts to a traditional non-virtualized platform.

TABLE 1

| Memory Category | Memory Type | Reconstruction Method |
|---|---|---|
| Kernel | Text/read-only data pages | Parity Page |
|  | Reconstruction code pages | Not Protected |
| Virtual Machine | Guest OS Text | Parity Page |
|  | Application/Shared library text | Parity Page |
|  | Contexted-Based Shared Memory | Parity Page |
|  | Clean memory pages that have been stored in the wap file | Refill-From-Disk |
| User World Applications | Text/shared library (copy on disk) | Refill-from-disk |
|  | Test/shared library (on visorFS) | Parity Page |
|  | Read-only memory mapped segments | Parity Page |
|  | Clean memory stored in the swap file. | Refill-from-disk |

Kernel. In some embodiments, the pages in the kernel (other than the reconstruction pages such as the parity pages themselves) are protected by parity. In such embodiments, when the kernel is loaded into memory, N number of parity pages may be stored in memory for a set M number of kernel pages. In some embodiments, the parity pages may be constructed as the kernel is loaded into memory. In such embodiments, the boot loader process may be extended to construct parity page as part of the boot loading process. In some embodiments, the parity pages may be stored on disk and retrieved with the kernel. In such embodiments, the boot loader process may be extended to retrieve the parity pages along with the kernel. In some embodiments, the given number M for the set of kernel pages for which M number of parity pages will be constructed may be stored in a configuration file that is checked during the boot loader process. The given number N may also be stored in a configuration file that is checked during the boot loader process.

Virtual Machines. In some embodiments, whether a page from a virtual machine will be protected by parity or by refill-from-disk depends on its category and type. That is, some VMs may be designated by an administrator as being critical, justifying the additional resource requirements of implementing the parity pages. VMs contain several types of read-only memory such as Guest OS text, application text, and shared library text. In some embodiments, the VMM may be enhanced to provide information about such pages. In other embodiments, information about such pages may be obtained directly from the Guest OS using para-virtualization techniques.

In some embodiments, Guest OS text will be protected by parity in a similar manner as protecting the kernel by parity as discussed above. In some embodiments, the application text and shared library text may also be protected by parity.

In some embodiments, pages that are shared with other VMs using a content-based page sharing mechanism may be protected by parity. A content-based page sharing mechanism reduces the demand on the memory by allowing one or more contexts, such as VMs, to share a single copy of a page of memory when possible and convenient, but creating private copies of the pages when necessary. For example, as described above, for each VM, there is a mapping for memory pages between the guest physical page number ("GPPN") and the actual machine page number ("MPN") as illustrated at 522 and 524 of FIG. 5. When a page is shared using a content-based page sharing technique, a module detects if there are two or more machine pages in memory containing the same content. For example, there may be a mapping $GPPN_1 \rightarrow MPN_1$ and another mapping $GPPN_2 \rightarrow MPN_2$, however, both machine pages referred to by $MPN_1$ and $MPN_2$ may contain the same content. Thus, one of the GPPN to MPN mappings may be changed so that more than one GPPN maps to the same MPN. For example, the second mapping might be changed to $GPPN_2 \rightarrow MPN_1$. The address space in memory for $MPN_3$ can then be reclaimed, thus freeing the space in memory that contained the duplicative content.

Sharing may take place either intra-context or inter-context, or both. An example of an implementation of content-based page sharing is described in U.S. Pat. No. 6,798,156 to Waldspurger for "Content-Based Transparent Sharing of Memory units," ("the 156 patent"), the entire content of which is incorporated herein by reference. This example of content-based sharing is provided for illustrative reasons, however, and is not mean to be limiting in anyway. Using other methods to create shared pages would be well understood in the art.

To construct parity pages for the shared pages, each time a page is shared, a process will be used to determine if a parity page should be constructed for the shared page. In some embodiments, the process for sharing pages described above may be extended to keep track of the number of shared pages that have been added since the last parity page was constructed. Once a shared page is added, the process will determine if the number of shared pages added since the last parity page was constructed is equal to M, the number of pages in the set for which a parity page will be constructed. If the number of shared pages is equal to M, then a parity page will be constructed. In other embodiments, a parity page may be created for a set of pages smaller than M, and then that parity page will be updated as more pages are added until M pages have been added. After M pages have been added, another parity page will be created for the next set of pages that have been added until M more pages have been added, after which the process will repeat. In some embodiments, a data structure may be used to keep track of each shared page. One example of such a data structure is the Hash Table Data Structure described in U.S. Pat. No. 6,789,156, which has been incorporated by reference. This example, however, is not meant to be limiting. Data structures that could be used to store shared pages would be well understood in the art.

In some embodiments, clean VM pages in the swap file are protected by refill-from disk. As explained above, in some embodiments, the disk has a swap file, which allows for more efficiently accessing such pages when they are needed again in memory. When such a page is reloaded into memory, a reference may be kept to the location in the swap file, so that the page may be reloaded from the swap file if there is a memory error. The page may also be write-protected, so that the reference will be deleted if the page is written to.

User World Applications. In general, for User World Applications, all application text including shared library text have intact copies available on a storage device and therefore, memory pages for application texts may be protected by refill-from-disk when they are loaded into memory. Also, memory pages whose content is still intact in the swap may be protected by refill-from-disk, in a manner similar to that described above with respect to VMs. This protection will be available until either the memory page is dirtied or the swap block is reclaimed.

In operating systems implementing a RAM file system for shared memory pages for application texts, the shared memory pages may be protected using parity. An example of such a RAM file system is the visorFS system incorporated into products available from VMware Inc., of Palo Alto, Calif. Parity may also be used to protect read-only memory mapped segments for User World Applications.

Constructing Parity Pages Using a Daemon

In some embodiments, parity pages for non-kernel memory may be constructed by a daemon as pages are loaded into memory. Daemons are well understood in the art of computer science. A daemon is a program that runs in the background rather than being under the control of the user. Daemons are often launched by the operating system during the boot process and may be set to run periodically or in response to a specific action.

Figure 6:
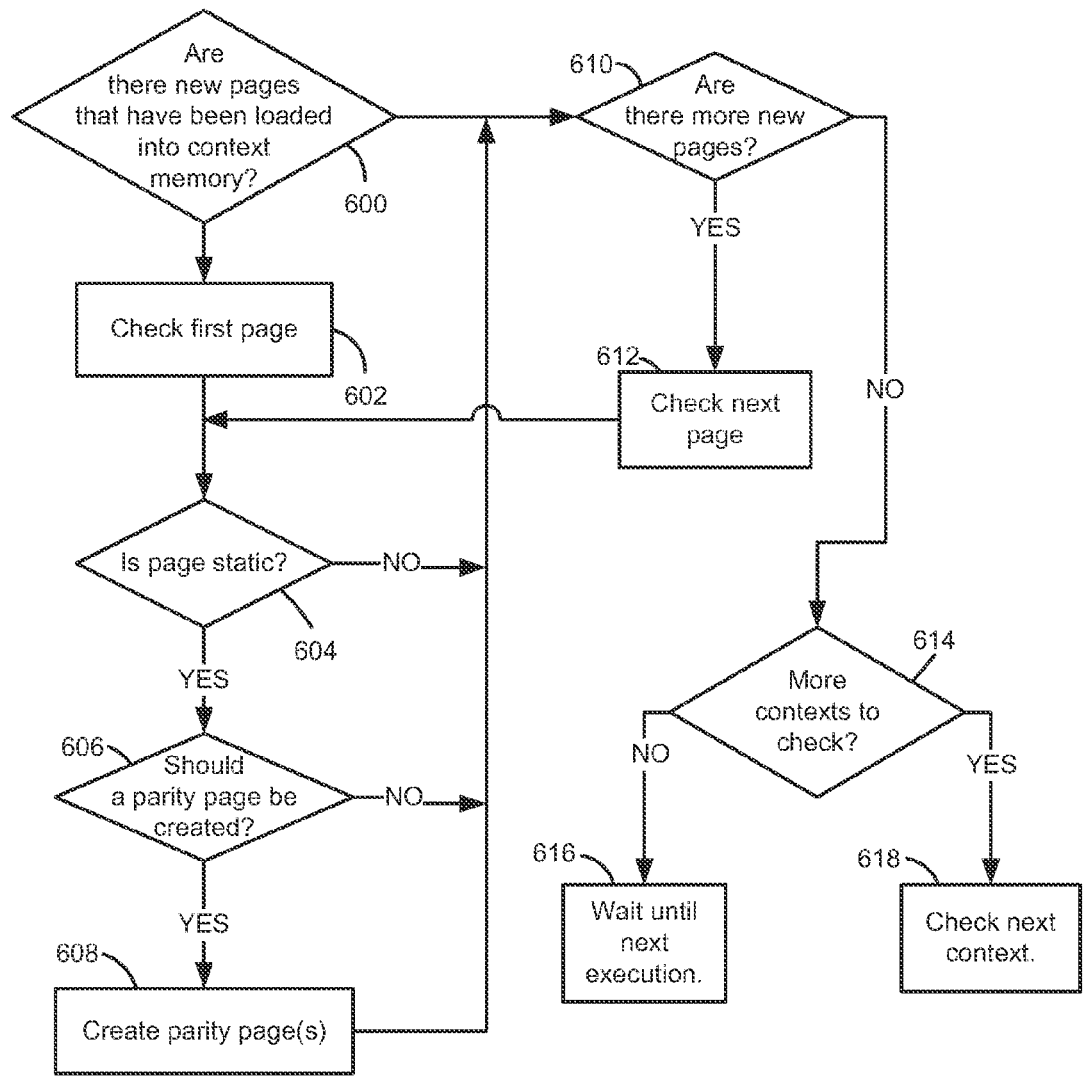
FIG. 6 is a flowchart illustrating a daemon for constructing parity pages.

FIG. 6 is a flowchart illustrating one example of a daemon process for constructing parity pages. At step 600, the daemon determines for each non-kernel, context running in memory which pages are new, i.e., which pages have been loaded into memory since the last time it was run. It would be well understood in the art of computer science how the daemon may determine which pages are new.

For example, the daemon may look for newly added pages in a list which is updated by the page fault handler to add new pages. In such embodiments, the page fault handler may update this list, whenever a page fault is served by fetching a page from disk/swap into the main memory. When the daemon is done processing the page, i.e. either by creating a parity page or deciding that no parity is required for this page, will remove this page from the list. A page that may already be part of a parity page (because it was present in the memory but was swapped out) will not be considered a new page, because the daemon will have this information via the list of the pages for parity is being maintained. In other embodiments, the daemon may search through data structures, such as the page table of different contexts to determine which pages are new. For example, in a non-virtualized system, the daemon may search through the page table for each process. In a virtualized system, the daemon may search through the page table for each User Word Application process, and the page table containing the GPPN to MPN mappings for each VM (illustrated at 522 and 524 of FIG. 5). In embodiments in which them is a data structure that stores the content-based shared pages, the daemon may search through that data structure to determine if there are any new shared pages since the last time the daemon executed. In such embodiments, the set of content-based shared pages may be treated by the daemon as another "context" for the limited purpose of constructing new parity pages for the set.

Once the daemon has determined that there is a new page, the first page is checked at 602. At 604 it is determined if the page is static. The page may be determined to be static if it is marked read-only, if it is executable, or if it is a content-based shared page. In some embodiments, the page may be determined to be static if the page is to be protected by parity based on a policy, such as the one described above with reference to Table 1. If the page is not static, the daemon determines if there are more new pages at 610, and if so, checks the next page at 612, and continues at 604. If there are no new pages at 610, the daemon determines if there are more data structures to check at 614, and if so checks the next one using the same process at 616. If there are no more contexts to check, the daemon waits until its next execution at 618.

If the page is static, the daemon determines if it should construct a new parity page at 606. In some embodiments, a new parity page will be constructed if the number of new static pages for the context since the last time a parity page was constructed is equal to M, the number of pages in the set for which a parity page will be constructed for the context. In such embodiments, if the number of new pages for the context has not reached M, then the daemon continues at 610 by determining if there are any other new pages for the context. If at 606, it is determined that a new parity pages should be constructed, then at 608, the new parity page is constructed for the set of static pages that have been loaded into the context since the last time a parity page was constructed for the context. In some embodiments, there may be a policy that a certain number of parity pages, N, will be constructed for the set of M pages. In such embodiments, the daemon may construct N parity pages for the set of M pages. The daemon then continues at 610 determining if there are any more new pages in the context.

In other embodiments, a parity page may be created for a number of pages smaller than M, and then updated as new pages are added until the number of new pages added is equal to M. After M pages have been added, another parity page will be created for the next set of pages that have been added until M more pages have been added, after which the process will repeat. In such embodiments, it will be determined at 606 that either a new or updated parity page should be created, and the parity page(s) will be created at 608. The daemon then continues at 610 determining if there are any more new pages in the context. In some embodiments, the number M of pages in the set of pages for which a parity page will be constructed is determined based on a policy as discussed above. In some embodiments, this policy may vary based on the context. For example, in the virtualization environment discussed above, there may be one number for User World Application processes, another number for shared pages, and another number for VMs. In some embodiments, the number M may be hard coded. In other embodiments, the number M may be user definable. In some embodiments, the number N of parity pages that will be constructed by the daemon for a set of M pages is also determined based on a policy, as discussed above. In some embodiments, the number N may be hard coded. In other embodiments, the number N may be user definable.

Correcting Errors in Memory

Figure 7:
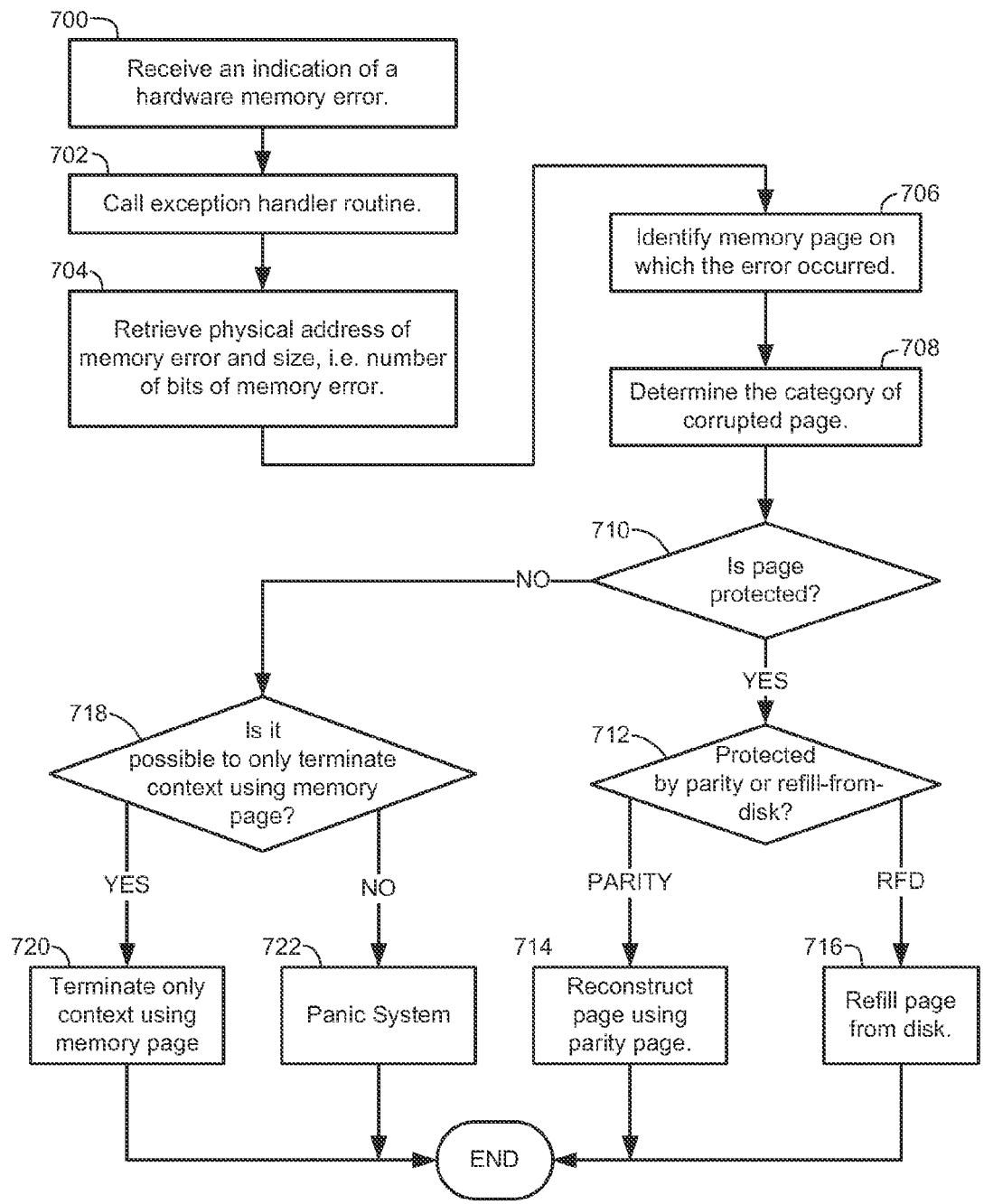
FIG. 7 is a flowchart illustrating a method for correcting errors in memory using either refill-from-disk or a parity page.

FIG. 7 is a flowchart illustrating a method for correcting errors in memory using either refill-from-disk or a parity page. In the description following, an embodiment of the present invention is presented in the context of a virtualized system platform. This description is provided for illustrative reasons and is not meant to be limiting in any way. It would be well understood in the art how to apply the same concepts to a traditional non-virtualized platform.

At step 700, an indication of a hardware memory error is received in the kernel. When the hardware notices that there is a memory error, the hardware notifies the operating system by invoking an exception, such as the machine check exception "MCE." In addition to notifying the system of the error, the hardware places data about the error in specific registers. This data includes information, such as the physical address of the memory error and its size. At step 702, the kernel calls the exception handler routine for handling memory errors, for example, the MCE exception handler. At step 704, the physical address of the memory error and its size are retrieved by the exception handler, for example by the MCE exception handler decoding the registers. At step 706, the memory page on which the error occurred is determined using the address of the error. Because the operating system partitions memory into pages, once the address of an error is known, the pages on which the error occurred can be determined. In general, pages are defined based on the higher order address bits in an address. The number of higher order address bits which define a page will depend on the size of the pages in the system.

As explained above, in some embodiments, whether a page on which a memory error has occurred was protected by parity or refill-from-disk will be based its category. For example in an embodiment using a virtualized system platform such as the one described above, the page's context may be in the one of the following categories: the kernel, a VM, or a User World Application. In embodiments which use categories to determine how pages are protected, the exception handler may be extended to determine the category of the corrupted page's context. This step is performed at 708.

In some embodiments, step 708 may be performed by the exception handler first checking one category, and if the corrupted page is not in that category, moving on and checking the next category. In some such embodiments, if the corrupted page is not found in any one of the categories that have protected-pages, at 710 it is determined that the page is not protected. An example is provided below of an embodiment for determining the category of a corrupted page in an embodiment using a virtualized system platform. This example is provided for illustrative purpose and is not meant to be limiting. The order described for searching through categories is also not meant to be limiting, and, it would be well understood in the art how to apply the concepts discussed to a traditional non-virtualized platform.

In an embodiment using a virtualized system platform, the exception handler may first determine if the corrupted page is in use by the kernel. In the UNIX and Linux operating systems, and the ESX® Server available from VMware of Palo Alto, Calif., the kernel is mapped to a particular address space in memory and thus, determining whether a corrupted page is in use by the kernel is performed by checking to see if the error falls on a page in the kernel's address space. In operating systems in which the kernel is not loaded into one particular address space in memory, it is possible to keep track of where the kernel is loaded. As the system is booted, the boot loader has to know where it needs to map the next module. Even if the next address is a random address, the boot loader must provide that information to the OS. In such a system, the information about where the kernel is loaded in memory may be tracked. For example, in some embodiments, when the boot process is loading the kernel and provides the information to the operating system about where the next page of the kernel will be loaded, this information may be stored in a data structure in the kernel. In such a system, the exception handler may search through that data structure to determine if the corrupted page is in use by the kernel.

If the corrupted page is not in use by the kernel, the exception handler may then check another category. For example, in some embodiments using the virtualized system described above, the exception handler may next determine if the corrupted page is in use by a User World Application. Because the User World Application page tables contain an entry for each page in memory in use by each User World Application, the exception handler may determine if the corrupted page is in use by a User World Application by searching through the User World Applications' page tables.

If the exception handler determines that the corrupted page is not in use by a User World Application, the exception handler may then check to determine if the corrupted page is in use by another category. For example, in some embodiments using the virtualized system described above, the exception handler may check to determine if the corrupted page is in use by one or more VMs. In an embodiment in which there is a data structure containing each content-based shared page, such as the hash table data structure described in U.S. Pat. No. 6,789,156, the MCE exception handler may be extended to search through the data structure to determine if the error occurred on a shared page.

If the error did not occur on a shared page, the exception handler may continue by determining if the error occurred on a page in a particular VM. This may be done by searching through the page tables for each VM containing the GPP-N→MPG mappings (illustrated at 522 and 524 of FIG. 5).

Once the page's category is determined, at 710 the MCE checks to determine if the page is protected or not. As explained above with regard to both parity and refill-from-disk, if a page is protected by one of these methods, there will be an association between the corrupt page and the method for correcting it. This association would be kept in the kernel. For example, if the page is protected by parity, there will be an association between the page and the parity page. One example of such an association would be metadata in the page table associating the corrupted page with its parity page, such as a pointer to the parity page as illustrated at 360, 362, 364, and 366 of FIG. 3B. As also explained above, for refill-from-disk, in some embodiments an indication of the page's disk location may be stored in the page table, as illustrated at 420, 422, 440 and 442 of FIG. 4. These examples are described for illustrative reasons and are not meant to be limiting in any way. It would be well understood in the art how to create an association between the parity page and the pages in memory that it protects, or between the corrupted page and its associated refill-from-disk location.

If it is determined that the page in memory is protected, then at 712 it is determined if the page is protected by parity or refill-from-disk. In some embodimens, it may be determined first if the page is protected by parity before it is determined if the page is protected by refill-from-disk. If the page is protected by parity, then at 714, the page is reconstructed using the parity page as described above and the exception handler routine ends. If the page is protected by refill-from-disk, then at step 716 the page is reloaded from its disk location and the exception handler routine ends.

In some embodiments, if at 710, it is determined that the page is not protected by either parity or refill-from-disk, then at 718 it is determined if it is possible to only terminate the contexts which are using the page at 720 or whether to panic the system at 722. At 716, the category of the page may be used to determine if the MCE should panic the entire system or may just shut down the context on which the error occurred. For example, in the embodiment described above, if the page is in the kernel, but is not protected by parity, e.g. a page that contains the reconstruction code itself, then in some embodiments, the MCE may panic the entire system. If instead, it is determined that the unprotected page is in a User World Application, then only that User World Application may need to be terminated. Also, if it is determined that the page is in just one VM, only that VM need be terminated. If it is determined that the page is a content-based shared page, then only the VMs using the memory page need to be terminated.

If the page on which the error occurred is not in one of the categories which the MCE was extended to check, then in embodiments using an operating system that is able to terminate only the context using the memory, such as the Solaris Operating System from Oracle Corp. of Redwood City, Calif., the operating system will determine at 718 if only the context using the memory will be terminated at 720.

In some embodiments, if the error is determined to be a persistent error, then additional steps are added to the method for correcting the error. For example, if the page is protected by parity, then at 712, the reconstructed page will be loaded into another memory page and all page table mappings to the original page will be changed to the address of the reconstructed page. If the page is reconstructed using refill-from-disk, then the page will be reloaded into a new address in memory, and all mappings to the original page will be changed to the new address.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A system comprising:
 a memory for storing a plurality of pages and a second plurality of pages; and
 a processor programmed to:
 store an indication of a disk location of each of the plurality of pages such that each of the plurality of pages may be reconstructed by refilling the page from disk in response to a memory error on the page, wherein the error in the memory is a corrupted page of the plurality of pages; and
 store parity pages such that any page in the second plurality of pages may be reconstructed using one of the parity pages.

2. The system of claim 1, wherein the processor is further programmed to:
- determine whether a corrupted page on which the error has occurred is protected by parity or refill-from-disk;
- when the corrupted page is protected by parity, reconstructing the page using a parity page associated with the corrupted page; and
- when the corrupted page is protected by refill-from-disk, reloading the page from its location on the disk.

3. The system of claim 2, wherein the processor is further programmed to mark a page for which the parity page has been constructed as read-only so that there will be a protected-page fault on an attempt to write to the page.

4. The system of claim 1, wherein the processor is further programmed to determine whether to protect a particular page by storing a parity page or an indication of the disk location for the particular page in the memory, the determining being based at least in part on a policy for a category of the particular page.

5. The system of claim 1, wherein the processor is further programmed to determine, in the event the corrupted page is not protected, whether it is possible to only terminate a context using the corrupted page, and if so, terminating that context.

6. One or more non-transitory computer readable media comprising computer-executable instructions that when executed by a processor, cause the processor to:
- for a first set of pages in a system memory, store one or more parity pages such that any page in the first set of pages may be reconstructed using one of the parity pages; and
- for a second set of one or more pages in the system memory that are not in the first set of pages, store an indication of the disk location of each page in the second set such that each of the one or more pages in the second set may be reconstructed by refilling the page from disk.

7. The one or more non-transitory computer readable media of claim 6, wherein the computer-executable instructions further cause the processor to determine whether to store a parity page or an indication of the disk location for a page in memory, the determining being based at least in part on a policy for a category of the page.

8. The one or more non-transitory computer readable media of claim 6, wherein the computer-executable instructions further cause the processor to determine whether to store a parity page or an indication of the disk location for a page in memory is based at least in part on a policy regarding the page's type.

9. The one or more non-transitory computer readable media of claim 8, wherein the policy comprises storing a parity page if a page against which the policy is applied is a static page.

10. The one or more non-transitory computer readable media of claim 8, wherein the page against which the policy is applied is determined to be a static page if the page against which the policy is applied is read-only, executable, or a content-based shared page.

11. The one or more non-transitory computer readable media of claim 6, wherein there is a predetermined maximum number of pages in the first set for which a parity page will be constructed, the predetermined maximum number of pages being determined based on a policy.

12. The one or more non-transitory computer readable media of claim 6, wherein the method further comprises marking a page for which a parity page has been constructed as read-only so that there will be a protected-page fault on an attempt to write to the page.

13. One or more non-transitory computer readable media comprising computer-executable instructions that when executed by a processor, cause the processor to:
- determine whether a corrupted page on which an error has occurred is protected by parity or refill-from-disk;
- when the corrupted page is protected by parity, reconstructing the page using a parity page associated with the corrupted page; and
- when the corrupted page is protected by refill-from-disk, reloading the page from its location on disk.

14. The one or more non-transitory computer readable media of claim 13, wherein the computer-executable instructions further cause the processor to:
- retrieve a physical address of an error and using the physical address of the error to determine the physical address of the corrupted page;
- use the physical address of the corrupted page to determine whether the corrupted page is protected or not, and if protected, determine whether the corrupted page is protected by parity; and
- if the corrupted page is not protected by parity, refill-from-disk.

15. The one or more non-transitory computer readable media of claim 13, wherein the computer-executable instructions further cause the processor to: determine, in the event the corrupted page is not protected, whether it is possible to only terminate a context using the corrupted page, and if so, terminating that context without panicking the system.

16. The one or more non-transitory computer readable media of claim 15, wherein the corrupted page is determined to be protected by parity if the corrupted page is in kernel memory space.

17. The one or more non-transitory computer readable media of claim 16, wherein the corrupted page is determined to be protected by parity if the corrupted page is a content-based shared page.

18. The one or more non-transitory computer readable media of claim 15, further comprising searching page tables for the contexts loaded into memory for the physical address of the corrupted page and determining, using the page tables, which context is using the corrupted page.

19. The one or more non-transitory computer readable media of claim 15, wherein determining whether a corrupted page on which an error has occurred is protected by parity or refill-from-disk is based on whether the corrupted page is in a kernel or an application.

* * * * *